(12) United States Patent
Aoki et al.

(10) Patent No.: US 6,679,429 B2
(45) Date of Patent: Jan. 20, 2004

(54) BAR CODE SCANNING DEVICE

(75) Inventors: Hiroshi Aoki, Hanno (JP); Takeshi Yamazaki, Hachioji (JP); Akifumi Kabeya, Sagamihara (JP); Kazutoshi Shiratori, Hino (JP); Masayuki Fujii, Urawa (JP); Kazunari Tokuda, Hachioji (JP); Hiroshi Miyajima, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 364 days.

(21) Appl. No.: 09/768,548

(22) Filed: Jan. 24, 2001

(65) Prior Publication Data
US 2001/0015379 A1 Aug. 23, 2001

(30) Foreign Application Priority Data

Jan. 28, 2000 (JP) .......................................... 2000-019643

(51) Int. Cl.$^7$ ................................................. G06K 7/10
(52) U.S. Cl. ............................. 235/462.43; 235/462.36
(58) Field of Search ...................... 235/462.36, 462.43, 235/462.45, 462.46, 472.01, 472.02

(56) References Cited

U.S. PATENT DOCUMENTS

| | | | |
|---|---|---|---|
| 5,708,262 A | 1/1998 | Goldman et al. | |
| 5,744,789 A | 4/1998 | Kashi | |
| 5,880,452 A | * 3/1999 | Plesko | 235/472.01 |
| 6,188,504 B1 | 2/2001 | Murakami et al. | |
| 6,282,008 B1 | 8/2001 | Togino | |

FOREIGN PATENT DOCUMENTS

| | | |
|---|---|---|
| JP | 08-212285 | 8/1996 |
| JP | 09-167199 | 6/1997 |
| JP | 10-123449 | 5/1998 |
| JP | 11-361053 | 6/2001 |

OTHER PUBLICATIONS

U.S. patent application Ser. No. 09/541,027—specification, claims, Abstract and drawings.

* cited by examiner

*Primary Examiner*—F. L. Evans
(74) *Attorney, Agent, or Firm*—Frishauf, Holtz, Goodman & Chick, P.C.

(57) ABSTRACT

The present invention provides a bar code scanning device that is compatible, in terms of communication and data, with information equipment conforming to PCMCIA standards, that is mounted in a card housing of a compact flash card size, and that has a laser beam scanning section integrated thereinto and which applies a scanning beam to an interior of the card housing through a window to obtain bar code information from light obtained when the scanning beam from the window is reflected.

17 Claims, 5 Drawing Sheets

BAR CODE SCANNING DEVICE

CROSS-REFERENCE TO RELATED APPLICATIONS

This application is based upon and claims the benefit of priority from the prior Japanese Patent Application No. 2000-019643, filed Jan. 28, 2000, the entire contents of which are incorporated herein by reference.

BACKGROUND OF THE INVENTION

The present invention relates to a bar code scanning device that irradiates a mark of symbol to be read with a scanning beam to read described information from light reflected therefrom, and in particular, to a small, light, and thin bar code scanning device that can be easily installed in a standard computer terminal connector (what is called a card slot) for a card standardized as defined by PCMCIA (Personal Computer Memory Card International Association), a compact flash card, or the like.

Conventional scanning systems using a laser have a portable of fixed type scan device mounted therein to read information described in a mark or symbol having portions with different reflectances, for example, a bar code when the laser is passed in front of the device.

The scan device generates a laser beam or the like, which is then collected and emitted to a position to be read or over a distance to be read in such a manner a beam spot of a predetermined diameter is formed at that position or over that distance. A beam emitted to a bar code is scanned so as to traverse the bar code, and a photodetector receives light reflected from the bar code and photoelectrically converts it to generate a detection signal. The detection signal is decoded as data described in the bar code.

A scanning mechanism for scanning the beam may be arranged in a housing, and the beam may be scanned so as to traverse the bar code or may be scanned over a detecting surface of the photodetector, or both of these scans may simultaneously be executed. In general, these scans are mechanically executed by a drive motor connected to a reflector. Additionally, some scanning mechanisms use a charge coupled device (CCD) to electrically detect a signal.

Each industry has been using unique bar codes to manage sales or stocks, and various bar code readers and laser scanning systems for decoding these bar code patterns as a display of a plurality of digits have been developed and used.

In addition, the PCMCIA, which is organized by manufacturers of many types of memory cards and related peripheral equipment, specifies three types of card standards for all circuit boards used in computers of reduced sizes, depending on the vertical and horizontal widths and thickness of the card.

(a) Type 1 memory cards are of the same size as normal credit cards, which are about 54 mm in vertical width and 85.6 mm in horizontal width. These memory cards, however, have a thickness of 3.3 mm, which is larger than that of the credit cards.

(b) Type 2 memory cards can provide higher performance and thus have a memory constituting site that cannot be housed in the type 1 memory card. These memory cards are equivalent to the above credit cards in vertical and horizontal lengths, but have a total thickness of 5.0 mm due to the presence of a raised portion. A substrate portion of these memory cards has a horizontal length of 48 mm.

(c) Type 3 memory cards have been developed under the sponsorship of the Small Form Factor Committee and can be connected to a 1.8-inch small-form-factor disk drive via a memory card connector for a small-sized portable computer.

The type 3 memory cards are equivalent to the type 1 and 2 memory cards in vertical and horizontal lengths but have a thickness of 10.5 mm in a total thickness. Further, these memory cards accommodate a horizontally significantly raised substrate portion and thus have a card guide opening of 51 mm width on a head connector.

In addition to the above described memory cards, various cards (hereafter referred to as "PC cards") are used which correspond to interfaces (SCSI cards) to modems, disk drives, and host computers depending on the type of a circuit built into the card.

These PC cards conform to a specified standard connector size and are thus compatible with most portable computers (notebook computers). They are also designed so as to be easily mounted in and removed from a computer and have recently been commonly used because they can easily and inexpensively improve the capabilities of the computer.

A device having the above described scanning mechanism integrated inside a housing of such a PC card to scan bar code information has been proposed in U.S. Pat. No. 5,744,789 (first publication) or the like, but no specific scanning mechanism has been disclosed.

Thus, based on the above described conventional techniques, the applicant has proposed in U.S. Pat. No. 5,708,262 (second publication) a bar code scanning device having a specific scanning mechanism integrated into a PC card in order to provide a compact and light bar code scanning device that can be easily adapted to peripheral equipment for processing and that can apply scanning beams in desired directions. The second publication, however, discloses the specific structure of the scanning mechanism integrated into the housing of the PC card but does not disclose specific numerical values such as the size of the scanning mechanism which are required for actual production.

That is, the second publication does not indicate whether the scanning mechanism is built into a housing of 3.3 mm thickness according to the type 1, a housing of 5.0 mm thickness according to the type 2, or a housing of 10.5 mm thickness according to the type 3, and still has room for improvement in terms of the reduced size, weight, and thickness of the bar code scanning device which are appropriate for building the device into the PC card housing.

In particular, the second publication does not refer to the point that the scanning mechanism is integrated into a card housing of a size corresponding to compact flash (CF) cards, which are new interfaces recently employed for small-sized portable terminals such as electronic handbooks, handy terminals, mail terminals, or cellular telephones, or miniature PC cards.

BRIEF SUMMARY OF THE INVENTION

It is an object of the present invention to provide a bar code scanning device with a scanning mechanism integrated thereinto which can be adapted to equipment for processing bar code information, such as a notebook computer or small-sized portable terminal, and which allows its own size, weight, and thickness to be reduced.

To attain this object, the present invention provides a bar code scanning device comprising a light source for generating a laser beam, a laser beam scanning section for applying the laser beam generated by the light source to a target bar code via a window portion as a scanning beam, a sensor for obtaining reflected light provided when the scanning beam is reflected from the bar code, to generate a detection signal based on an intensity of the reflected light, a signal processing section for controlling driving of the laser beam scanning section and generating bar code information from the detection signal generated by the sensor, and an external connection terminal for transmitting and receiving the bar code information generated by the signal processing section to and from a bar code data processing device, wherein (a center line of) a longitudinal direction of the window portion of the laser beam scanning section through which the scanning beam is emitted crosses, at a predetermined angle, a parallel line (an axial principal ray or an extension of an optical axis) of an optical axis of the laser beam generated by the light source.

Alternatively, the present invention provides a bar code scanning device comprising a light source for generating a laser beam, a laser beam scanning section for applying the laser beam generated by the light source to a target bar code via a window portion as a scanning beam, a sensor for obtaining reflected light provided when the scanning beam is reflected from the bar code, to generate a detection signal based on an intensity of the reflected light, a signal processing section for controlling driving of the laser beam scanning section and generating bar code information from the detection signal generated by the sensor, and an external connection terminal for transmitting and receiving the bar code information generated by the signal processing section to and from a bar code data processing device, wherein the sensor and the signal processing device are disposed on a circuit board, and the light source and the laser beam scanning section are arranged in a notch portion of the circuit board.

Further, the light source is arranged such that (a center line in) a longitudinal direction of the window portion is substantially orthogonal to a parallel line (an axial principal ray or an extension of an optical axis) of an optical axis of the laser beam generated by the light source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the drawings.

Figure 1:
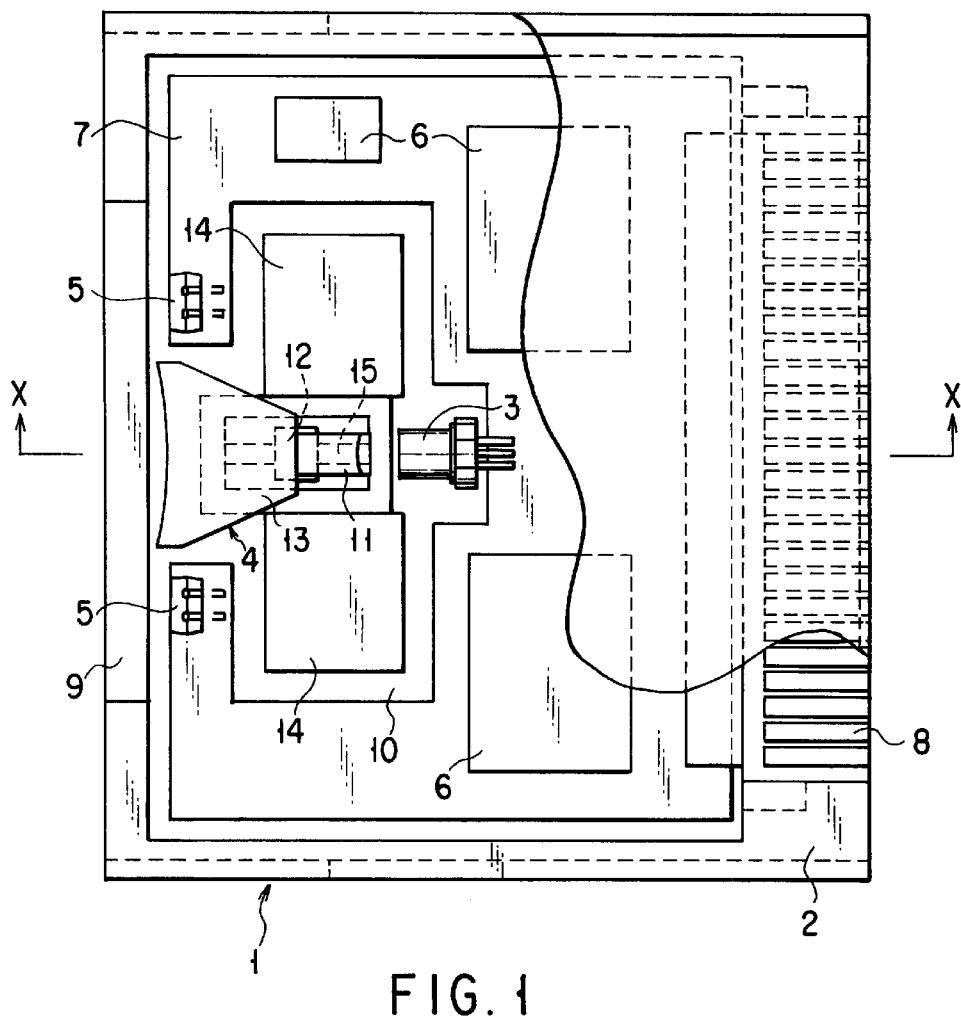
FIG. 1 is a top view showing the configuration of a bar code scanning device as a first embodiment.
Figure 2:
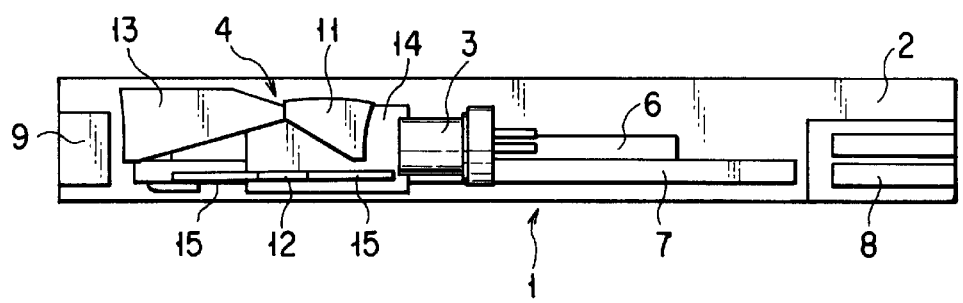
FIG. 2 is a sectional view of the bar code scanning device shown in FIG. 1, taken along line X—X in the same figure.
Figure 3:
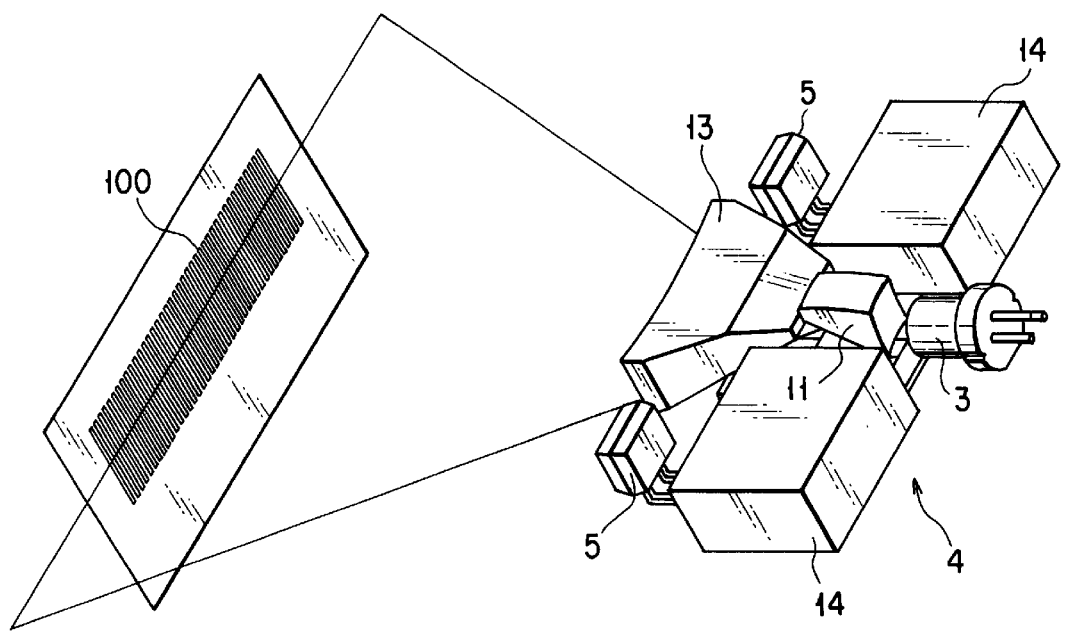
FIG. 3 is a perspective view showing how the bar code scanning device (only an integral part is disclosed) of the first embodiment irradiates a target bar code with a scanning beam.
Figure 4:
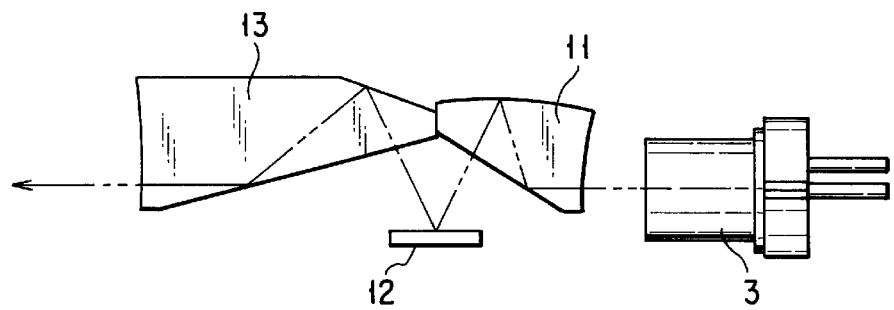
FIG. 4 is a sectional view showing an integral part of the bar code scanning device of the first embodiment and which is useful in explaining the operation of a laser beam.

FIGS. 1 to 4 show a first embodiment of a bar code scanning device of the present invention. FIG. 1 is a top view schematically showing the configuration of the bar code scanning device. FIG. 2 is a sectional view of FIG. 1 taken along line X—X in the same figure. FIG. 3 is a perspective view showing how the bar code scanning device (only an integral part is disclosed) of the first embodiment irradiates a target bar code with a scanning beam. FIG. 4 is a sectional view showing an integral part of the bar code scanning device of the first embodiment and which is useful in explaining the operation of an applied laser beam.

This bar code scanning device 1 comprises a visible laser diode (hereafter referred to as an "LD") provided inside a housing 2 (hereafter referred to as a "card housing") of a compact flash card size and acting as a light source for generating a laser beam, a laser beam scanning section 4 for applying the laser beam generated by the light source to a target bar code 100 as a scanning beam, a pair of sensors 5 for obtaining reflected light provided when the beam is reflected from the bar code, to generate a detection signal based on the intensity of the reflected light, a circuit substrate 7 having an electronic circuit such as a signal processing section 6 for processing the signal detected by the sensor 5 and controlling driving of the laser beam scanning section 4, and a connection terminal 8 for connection to a processing apparatus such as an external computer.

The card housing 2 has a window portion 9 formed opposite the connection terminal 8 and through which the scanning beam from the laser light scanning section is emitted. Additionally, the circuit substrate 7 has a notch portion 10 and is substantially U-shaped. The pair of sensors 5 are provided on opposite ends of the window 9 on the circuit substrate 7, and the circuit substrate 7 (PCB 7) is connected to the LD 3 arranged in the notch portion. Further, the laser beam scanning section 4 is arranged in the notch portion and supported by the card housing 2.

The laser beam scanning section 4 comprises an incident optical system 11 on which a laser beam generated by the LD 3 is incident, a laser beam reflecting section 12 including a micromirror for reflecting the laser beam from the incident optical system 11, an emitting optical system 13 for emitting the laser beam from the laser beam reflecting section 12 to the bar code 100 as a scanning beam, and a scan driving section composed of an electromagnetic driving coil (not shown) and a pair of magnets 14 provided around the micromirror for driving the laser beam reflecting section 12.

In this configuration, a reflecting surface of the micromirror of the laser beam reflecting section 12 is arranged substantially parallel with the circuit substrate 7 and under an optical axis of a laser beam. In addition, the incident optical system 11 and the emitting optical system 13 are each formed of a composite free shaped prism comprising two integrally molded optical system each composed of a free-curved-surface optical system, and are arranged over the laser beam reflecting section 12 in such a manner as to sandwich the optical axis of a laser beam emitted from the LD 3 between themselves and the laser beam reflecting section 12.

The LD 3, the laser beam scanning section 4, and the window portion 9 are arranged within the notch portion 10 along the optical axis so that a parallel line (an axial principal ray or an extension of the optical axis) of the optical axis of a laser beam emitted from the LD 3 is substantially orthogonal to a longitudinal center line of the window portion 9.

In this case, the signal processing section 6 mounted on the circuit substrate 7 comprises a drive control section for controlling emission of a laser beam from the light source and driving of the laser beam scanning section 4, a decoder for processing a detection signal from the sensors 5 to generate bar code information, and other components. Well known techniques are used for control signals provided by the drive control section to drive the scanning mechanism and for processing executed by the decoder for signals detected by the sensors; detailed description of these techniques is thus omitted.

Additionally, the connection terminal 8 has a standard pin array that can be connected to a card slot formed in a notebook computer, a PDA terminal of an electronic handbook or the like, or a portable mail terminal. In this embodiment, a connector with two rows of 25 pins, that is, a total of 50 pins are used to meet the compact flash card standards.

The configurations of the incident optical system, the laser beam reflecting section, and the emitting optical system are described in detail in U.S. Ser. No. 09/541,027, previously disclosed by the applicant, and the configurations and operations of the laser beam are described in detail in U.S. Pat. No. 6,188,504, also previously disclosed by the applicant; these configurations and operations are thus omitted.

Then, the operation of the bar code scanning device configured as described above will be described.

As shown in FIG. 4, a laser beam from the LD 3 is reflected inside the incident optical system 11 twice and collected and directed to the laser beam reflecting section 12. In the laser beam reflecting section 12, the micromirror is swung by a drive shaft 15 (which comprises, as sohwn in FIG. 1 or FIG. 2, a pair of torsion bars for supporting said micromirror 12) that extends almost parallel to the laser beam emitted from the LD3. The micromirror swings so, because of the relation between the magnetic field of the magnet 14 and the current supplied to the electromagnetic driving coil. This vibration yields a scanning beam to be linearly scanned, which is then directed to the emitting optical system 13 for emitting the scanning beam. In the emitting optical system 13, as in the incident optical system 11, the scanning beam is reflected twice, has its scanning angle widened, and is optically adjusted such that a scanning line provided by the scanning beam is straight. The scanning beam is then emitted to the bar code 100 trough the window portion 9.

To perform the linear scanning efficiently, the micromirror 12 is swung by the drive shaft 15 in the laser-beam scanning section 4, at a resonant frequency equal or nearly equal to the frequency of the control signal (a periodically varying signal).

Reflected light obtained when the bar code 100 is irradiated with the scanning beam is detected by the pair of sensors 5 arranged near the opposite ends of the window 9; the sensors 5 then generate a signal proportional to the intensity of the detected reflected light. The signal output from the sensors 5 is processed by the signal processing section 6 arranged on the circuit substrate 7 in the card housing 2 and is then decoded into bar code information.

Figure 9:
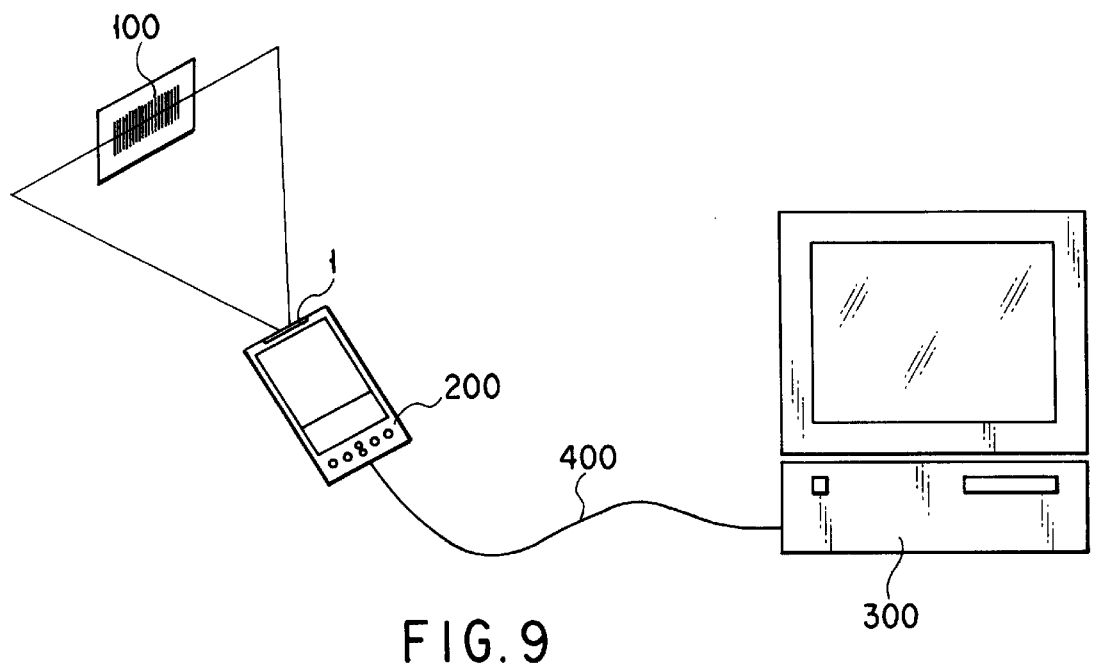
FIG. 9 is a view useful in explaining a system having the bar code scanning device of the present invention integrated thereinto.

Then, a system such as that shown in FIG. 9 and described later is used to transmit this bar code information to an interior of a portable information terminal or to a host computer such as a personal computer, where a required process such as sales or stock management is executed.

According to the first embodiment of the present invention configured as described above, each section is arranged such that the parallel line (the axial principal ray or the extension of the optical axis) of the optical axis of the laser beam emitted from the light source is substantially orthogonal to the longitudinal center line of the light source, thereby enabling the size of the housing to be reduced. Additionally, since the laser beam is reflected twice in each of the incident and emitting optical systems relative to a thickness direction of the housing, the length of an optical path can be increased despite the reduced size of the housing, thereby allowing a scanning angle required to scan the bar code to be easily obtained. Further, since the laser beam scanning section is arranged in the notch portion of the circuit board, an increase in the thickness of the housing can be prevented to enable the device to be built into a card housing having a thickness equal to or smaller than that of the type 2 card housing according to the PCMCIA standards or a compact-flash-sized card housing, specifically a thickness of 5.0 mm or smaller.

Next, a second embodiment of the present invention will be described.

Figure 5:
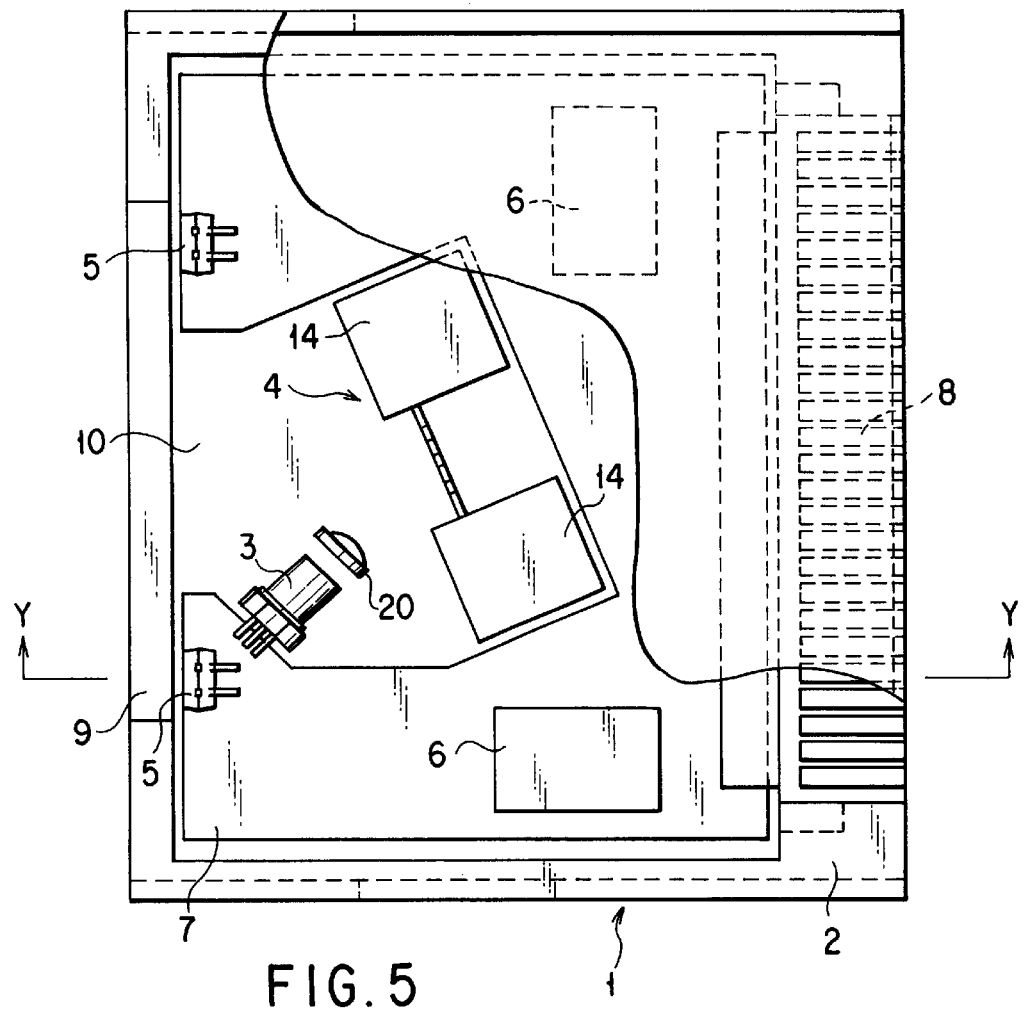
FIG. 5 is a top view showing the configuration of a bar code scanning device as a second embodiment.
Figure 6:
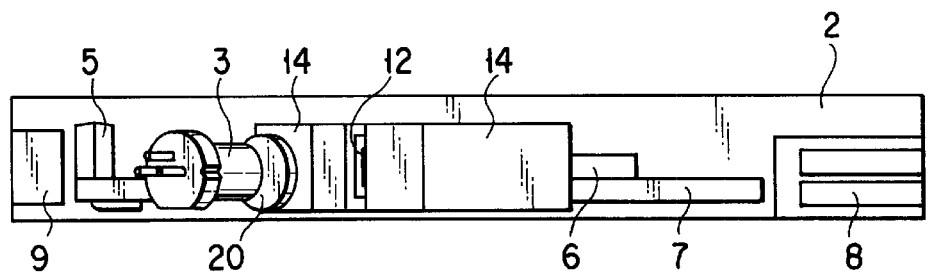
FIG. 6 is a sectional view of the bar code scanning device shown in FIG. 5, taken along line Y—Y in the same figure.
Figure 7:
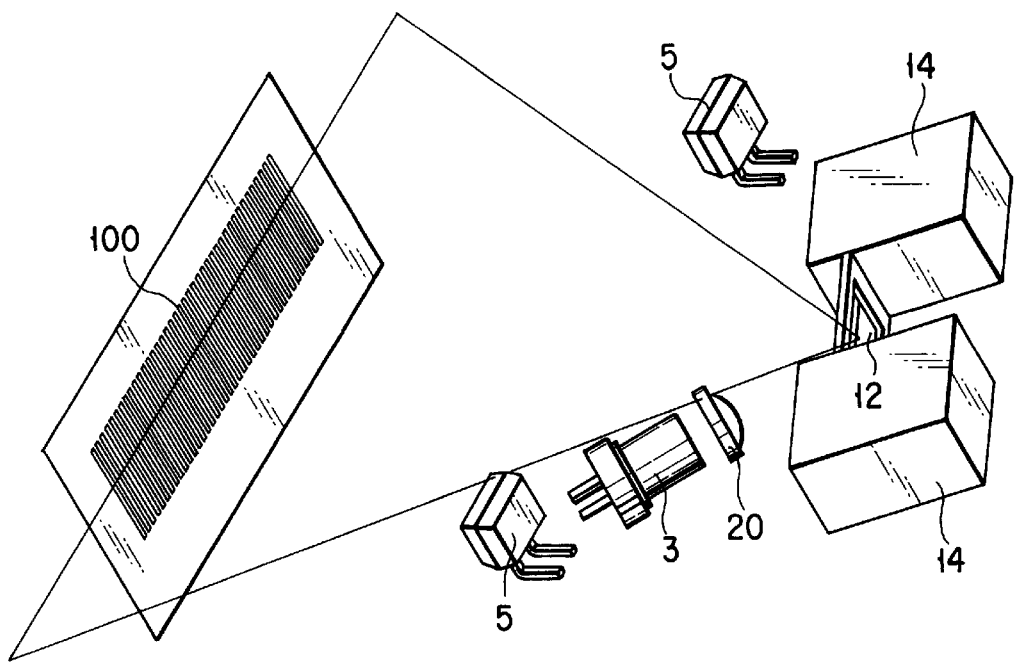
FIG. 7 is a perspective view showing how the bar code scanning device (only an integral part is disclosed) of the second embodiment irradiates a target bar code with a scanning beam.
Figure 8:
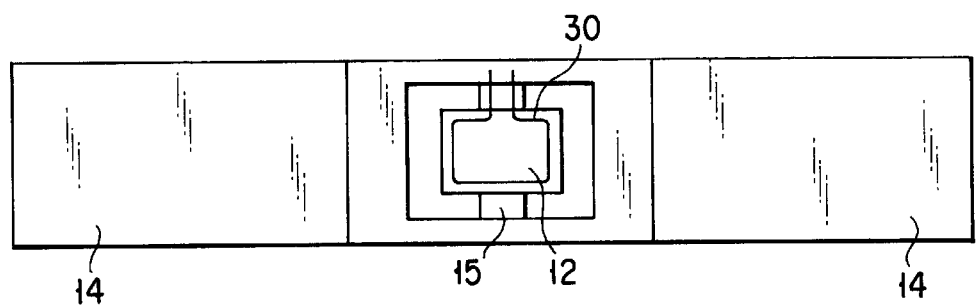
FIG. 8 is a front view showing an integral part of the bar code scanning device of the second embodiment and which is useful in explaining a laser beam scanning section.

FIGS. 5 to 8 show the second embodiment of the bar code scanning device according to the present invention. FIG. 5 is a top view schematically showing the configuration of the bar code scanning device of the second embodiment. FIG. 6 is a sectional view of FIG. 5, taken along line Y—Y in the same figure. FIG. 7 is a perspective view showing how the bar code scanning device (only an integral part is disclosed) of the second embodiment irradiates a target bar code with a scanning beam. FIG. 8 is a front view showing an integral part of the bar code scanning device of the second embodiment and which is useful in explaining the laser beam scanning section.

In the bar code scanning device 1 according the second embodiment, the micromirror 12 that is the laser beam reflecting section of the laser beam scanning section 4 is provided parallel with a thickness direction of the card housing, that is, arranged so as to stand up, and instead of the incident optical system 11 and the emitting optical system 13, a focusing lens 20 is provided in front of the LD 3. Thus, a laser beam from the LD 3 is applied to the micromirror 12 at an angle of 70° (when the mirror is stationary), and the micromirror 12 is vibrated around the shaft 15 by a current for a control signal flowing through the electromagnetic driving coil 30 provided around the mirror and by magnetic fields generated by the magnet 14, to generate a scanning beam, which is then applied to the bar code 100 via the window portion 9. The process executed after obtaining reflected light from the bar code is similar to that in the first embodiment. In this embodiment, as in the first embodiment, the LD 3 and the laser beam scanning section 4 (including the focusing lens 20) are arranged inside the notch portion 10.

According to the second embodiment of the present invention configured as described above, the laser beam scanning section is arranged in the notch portion of the circuit board as in the first embodiment to enable the thickness of the housing to be reduced, thereby making the housing smaller. Thus, the device can be built into a card housing having a thickness equal to or smaller than that of the type 2 card housing according to the PCMCIA standards or a compact-flash-sized card housing, specifically a thickness of 5.0 mm or smaller.

In addition, instead of the incident optical system 11 and the emitting optical system 13, the focusing lens 20 is provided in front of the LD 3, thereby enabling further weight reduction.

A system having the bar code scanning device 1 according to the first and second embodiments integrated thereinto will be simply explained with reference to FIG. 9.

The bar code scanning device 1 is installed in a card slot in a portable information terminal in such a manner that its window portion is directed to an exterior of the terminal. The terminal is further connected to a desk top type host computer 300 through a cable 400.

In such a system, a trigger switch provided in the portable information terminal 200 is operated to apply a scanning beam to the bar code 100 through the window portion of the bar code scanning device 1 built into the card slot in the terminal 200. Light reflected from the bar code is received and processed as described above to read bar code information. The bar code information is transmitted to an interior of the terminal 200 or to the host computer 300 connected thereto via the cable 400, where a required process such as sales or stock management is executed.

The above described embodiments have been described in connection with the one-dimensional linear scanning method of executing scanning along a single axis, but it is possible to use an all-direction scanning method of using continuous scan lines angularly displaced relative to one another based on an all-direction scanning pattern so as to accommodate various bar codes or a two-dimensional raster scanning method of using continuous scan lines along a first scan axis, the continuous scan lines being displaced from one another along a second vertical axis. Alternatively, the plurality of scanning methods can be switched by means of mode switching.

Furthermore, in each of the above described embodiments, the scanning beam is emitted from the window portion of the housing in a substantially horizontal direction, but it may be emitted therefrom in an oblique direction by arranging the mirror in the window portion or setting the shape of the reflecting surface of the emitting optical system as appropriate. If the scanning beam is set to be emitted obliquely downward from the window portion, then it is emitted downward when a user scans the bar code with the portable information terminal in his or her hand, so that the user can operate the bar code without the need to direct the terminal downward. Consequently, the scanning device can be operated more easily.

Additionally, each embodiment has been described taking by way of example the electromagnetic driving method using the electromagnetic driving coil and the magnet, but the driving method is not limited to this. It is possible to use an electrostatic driving method used for static motors or a piezoelectric driving method used for ultrasonic motors or the like and using a piezoelectric vibrator.

Figure 10:
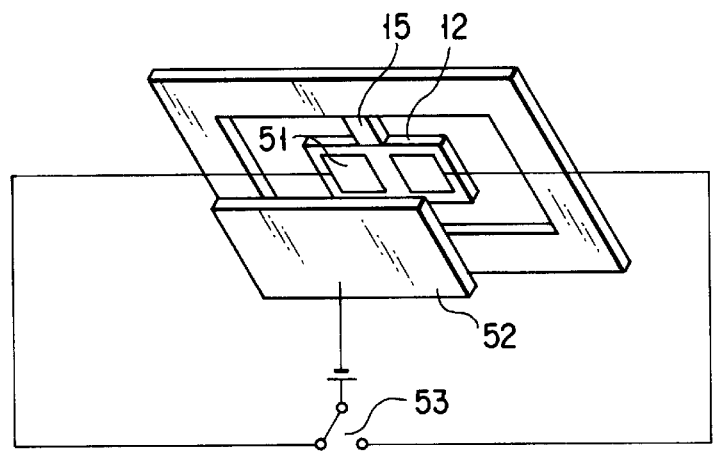
FIG. 10 is a view useful in explaining a laser beam scanning section employing an electrostatic driving method.

FIG. 10 is a perspective view showing a laser beam scanning section using the electrostatic driving method.

As shown in this figure, the laser beam scanning section using the electrostatic driving method has, instead of the electromagnetic driving coil, two movable electrodes 51 provided on a surface of the laser beam reflecting section 12 which is opposite to the reflecting surface and a fixed electrode 52 located opposite the movable electrodes. Then, when a voltage is applied between the fixed electrode and one of the two movable electrodes 51, a static attractive force is generated between the movable electrode 51 and the fixed electrode 52. This static attractive force moves the movable electrode 51 around the drive shaft 15 toward the fixed electrode 52 to bias the laser beam reflecting section 12.

Then, when a switch 53 is switched to apply a voltage between the other movable electrode and the fixed electrode to bias the laser beam reflecting section 12 in the opposite direction. Repeating this operation allowed the laser beam applied to the rear surface of the movable electrode 51 to be scanned, so that the resulting scanning beam is emitted from the window portion to the bar code.

This laser beam scanning section using the electrostatic driving method allows a drive coil, a detection coil, a permanent magnet, and a magnetic yoke to be omitted, thereby enabling the size and weight of the bar code scanning device to be further reduced compared to the electromagnetic driving method.

Further, each embodiment has been described in connection with the scan device built into the compact flash card housing, but the present invention is not limited to this. Variations or changes may be made to the configuration without deviating from the spirits of the present invention.

In addition, in either embodiment, a driving power supply to the compact flash card may be obtained from the host computer, or the card may comprise a built-in power source so as to be driven without an external power supply.

Since the spirits of the above described present invention are sufficiently apparent from the above description, those skilled in the art can use, without any further description, their current knowledge to easily employ the present invention for various applications without excluding features of the present invention definitely constituting the comprehensive or basic characteristics thereof. These applications should be and are intended to be understood within the contents or scope shown in the claims.

As described above, the bar code scanning device according to the present embodiment has the following effects:

First, the bar code scanning device is compatible with general computers including notebook and desktop personal computers; it is also inexpensive and light.

Second, the bar code scanning device can be integrated into a card slot employed in the notebook computer, so as to be connected to the computer.

Third, a scan device (a scanning mechanism, a beam generating light source, sensors, and a major part of a processing circuit) can be provided in a card housing of a thin card such as a PC card according to the PCMCIA standards or a compact flash card.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A bar code scanning device comprising:

a light source for generating a laser beam;

a laser beam scanning section for emitting the laser beam generated by the light source to a bar code to be read, via a window portion as a scanning beam;

a sensor for obtaining reflected light provided when said scanning beam is reflected from said bar code, to generate a detection signal based on an intensity of the reflected light;

a signal processing section for controlling driving of said laser beam scanning section and generating bar code information from said detection signal; and an external connection terminal for transmitting and receiving said generated bar code information to and from a bar code data processing device, wherein said sensor and said signal processing device are disposed on a same circuit board, and said light source and said laser beam scanning section are arranged in a notch section of said circuit board.

2. A bar code scanning device according to claim 1, wherein a center line of said window portion in a longitudinal direction of said window portion crosses, at a predetermined angle, one of a main optical beam of a parallel line of an optical axis of the laser beam and an extension line of the optical axis of the laser beam.

3. A bar code scanning device according to claim 2, wherein said light source is arranged such that the center line of said window portion in the longitudinal direction crosses one of the main optical beam of the parallel line of the optical axis of the laser beam and the extension line of the optical axis.

4. A bar code scanning device according to claim 1, further comprising a housing having said light source, said laser beam scanning section, said sensor, said signal processing section, and said external connection terminal all mounted on an inside thereof and having said window portion formed in a side surface thereof located opposite said external connection terminal.

5. A bar code scanning device according to claim 4, wherein said housing comprises an enclosure having a thickness of 5 mm or smaller.

6. A bar code scanning device according to claim 5, wherein said housing comprises an enclosure having vertical and horizontal dimensions of 54×86 mm or smaller, respectively, so as to be of a credit card size.

7. A bar code scanning device according to claim 5, wherein said housing comprises an enclosure having vertical and horizontal dimensions of 36×43 mm or smaller, respectively, so as to be of a compact flash card size.

8. A bar code scanning device according to claim 1, wherein said bar code scanning device is adapted to be compatible with a PCMCIA standard computer via said external connection terminal and a PCMCIA adapter.

9. A bar code scanning device according to claim 1, wherein said laser beam scanning section comprises an incident optical system on which the laser beam generated by said light source is incident, a laser beam reflecting section for reflecting the laser beam for the incident optical system, an emitting optical reflecting section for emitting the laser beam to said bar code via said window portion as the scanning beam, and a scan driving section for driving said laser beam reflecting section to scan said laser beam, and wherein said laser beam reflecting section is arranged on side in a vertical direction of the parallel line of the optical axis of the laser beam generated from said light source, and said incident optical system and said emitting optical system are arranged on another side in the vertical direction of the parallel line of the optical axis of the laser beam.

10. A bar code reflecting device according to claim 9, wherein:

said laser beam reflecting section comprises a reflecting surface comprising a micromirror arranged parallel with the parallel line of the optical axis of said laser beam, said scan driving section comprises an electromagnetic driving coil and a magnet provided around said micromirror, and said incident optical system and said emitting optical system each comprise a composite free shaped prism comprising two integrally molded optical system each comprising a free-curved-surface optical system.

11. A bar code scanning device according to claim 10, wherein said micromirror and said composite free-curved-surface are arranged on the parallel line of the optical axis of said laser beam.

12. A bar code scanning device according to claim 10, wherein said magnet comprises a pair of magnets laterally arranged around the parallel line of the optical axis of said laser beam.

13. A bar code scanning device according to claim 1, wherein said laser beam scanning section comprises a focusing optical system arranged in front of said light source, a laser beam reflecting section for reflecting a laser beam from the focusing optical system to emit the beam from the focusing optical system through said window portion to said bar code as the scanning beam, and a scan driving section for driving the laser beam reflecting section to scan said laser beam, and wherein the laser beam emitted from said window portion is laterally scanned through a determined angle relative to a direction in which the beam is emitted from said light source.

14. A bar code scanning device according to claim 1, wherein said sensor comprises at least a pair of sensors arranged near opposite ends of said window portion around the parallel line of the optical axis of the laser beam generated by said light source.

15. A bar code scanning device comprising:

a light source for generating a laser beam;

a laser beam scanning section for emitting the laser beam generated by the light source to a bar code to be read, via a window portion as a scanning beam;

a sensor for obtaining reflected light provided when said scanning beam is reflected from said bar code, to generate a detection signal based on an intensity of the reflected light;

a signal processing section for controlling driving of said laser beam scanning section and generating bar code information from said detection signal; and an external connection terminal for transmitting and receiving said generated bar code information to and from a bar code data processing device, wherein said window portion is arranged such that a longitudinal direction of said window portion crosses, at a predetermined angle, a parallel line of an optical axis of the laser beam generated by said light source, wherein said laser beam scanning section comprises an incident optical system on which the laser beam generated by said light source is incident, a laser beam reflecting section for reflecting the laser beam for the incident optical system, an emitting optical reflecting section for emitting the laser beam to said bar code via said window portion as the scanning beam, and a scan driving section for driving said laser beam reflecting section to scan said laser beam, and wherein said laser beam reflecting section is arranged on side in a vertical direction of the parallel line of the optical axis of the laser beam generated from said light source, and said incident optical system and said emitting optical system are arranged on another side in the vertical direction of the parallel line of the optical axis of the laser beam.

16. A bar code scanning device comprising:

a light source for generating a laser beam;

a laser beam scanning section for emitting the laser beam generated by the light source to a bar code to be read, via a window portion as a scanning beam;

a sensor for obtaining reflected light provided when said scanning beam is reflected from said bar code, to generate a detection signal based on an intensity of the reflected light;

a signal processing section for controlling driving of said laser beam scanning section and generating bar code information from said detection signal; and an external connection terminal for transmitting and receiving said generated bar code information to and from a bar code data processing device, wherein said window portion is arranged such that a longitudinal direction of said window portion crosses, at a predetermined angle, a parallel line of an optical axis of the laser beam generated by said light source, wherein said laser beam scanning section comprises a focusing optical system arranged in front of said light source, a laser beam reflecting section for reflecting a laser beam from the focusing optical system to emit the beam from the focusing optical system through said window portion to said bar code as the scanning beam, and a scan driving section for driving the laser beam reflecting section to scan said laser beam, and wherein the laser beam emitted from said window portion is laterally scanned through a determined angle relative to a direction in which the beam is emitted from said light source.

17. A bar code scanning device comprising a light source for generating a laser beam;

a laser beam scanning section for emitting the laser beam generated by the light source to a bar code to be read, via a window portion as a scanning beam;

a sensor for obtaining reflected light provided when said scanning beam is reflected from said bar code, to generate a detection signal based on an intensity of the reflected light;

a signal processing section for controlling driving of said laser beam scanning section and generating bar code information from said detection signal; and an external connection terminal for transmitting and receiving said generated bar code information to and from a bar code data processing devices wherein said window portion is arranged such that a longitudinal direction of said window portion crosses, at a predetermined angle, a parallel line of an optical axis of the laser beam generated by said light source, and wherein said sensor comprises at least a pair of sensors arranged near opposite ends of said window portion around the parallel line of the optical axis of the laser beam generated by said light source.

* * * * *